United States Patent [19]

Schelp

[11] 4,102,125
[45] Jul. 25, 1978

[54] HIGH TEMPERATURE GAS TURBINE

[75] Inventor: Helmut R. Schelp, Pacific Palisades, Calif.

[73] Assignee: The Garrett Corporation, Los Angeles, Calif.

[21] Appl. No.: 773,869

[22] Filed: Feb. 22, 1977

Related U.S. Application Data

[62] Division of Ser. No. 645,004, Dec. 29, 1975, Pat. No. 4,041,699.

[51] Int. Cl.² ............................ F02C 7/00; F02C 7/12
[52] U.S. Cl. .................................... 60/39.53; 60/39.59
[58] Field of Search ................ 60/39.05, 39.53, 39.55, 60/39.58, 39.59, 39.66, 39.71; 415/114

[56] References Cited

U.S. PATENT DOCUMENTS

| 2,369,795 | 2/1945  | Planiol et al. ........................ 415/114 |
| 3,238,719 | 3/1966  | Harslem .............................. 60/39.55 |
| 3,600,890 | 8/1971  | White ................................. 415/114 |
| 3,921,389 | 11/1975 | Kawaguchi ......................... 60/39.05 |
| 3,938,324 | 2/1976  | Hammond et al. ................. 60/39.66 |

Primary Examiner—Louis J. Casaregola
Attorney, Agent, or Firm—Jack D. Puffer; Stuart O. Lowry; Albert J. Miller

[57] ABSTRACT

A gas turbine engine is disclosed in which water is used to cool the turbine. The water is turned to steam in the hot turbine; is super-heated, and then injected into the combustor to aid in the gasification of the fuel, to reduce the flame temperature and improve emissions, as well as increasing the specific output of the engine.

12 Claims, 3 Drawing Figures

HIGH TEMPERATURE GAS TURBINE

This is a divisional application Ser. No. 645.004 filed Dec. 29, 1975, now U.S. Pat. No. 9,041,699.

BACKGROUND OF THE INVENTION

This invention relates to gas turbine engines in general and in particular to gas turbine engines having fluid cooled turbines.

In order to increase the power output and efficiency of gas turbines, it is desirable to operate such turbines at as high a turbine inlet temperature as possible. Presently these temperatures are limited to a range of 1800 to 2000° Fahrenhit, primarily because of temperature limitations of the metal alloys used in the rotating components. Higher inlet temperatures can be used if the turbine blades can be successfully cooled. In larger turbine engines air cooling of blades is successful, however, in small turbine engines the blades are of a substantially smaller size and do not provide sufficient metal thickness to allow air cooling passages of effective size.

Water cooling of turbine blades has been successful in the past in large stationary power generating plants. However, in order to avoid excessive water consumption it has been necessary to provide for condensation and recirculation of the cooling water. For small gas turbine engines, particularly in vehicle applications, the inclusion of such a condenser and recirculating system is impracticable.

SUMMARY OF THE INVENTION

The present invention overcomes these disadvantages by providing a small gas turbine engine in which the turbine is cooled by the injection of water into the turbine hub and into blind passages in the blades. Upon contact with the hot turbine surfaces the water is changed to steam and is discharged to a heat exchanger which utilizes turbine exhaust gases for further heating the steam. The steam is then injected into the combustor along with the fuel and compressed air from the engine compressor where it is used in the gasification process of the liquid fuel in the first stage of a two stage combustion process. During this stage of the process some of the steam is dissociated into $H_2$ and $O_2$ thereby increasing the heating value of the fuel. In additon to vaporizing and gasifying the fuel in a fuel rich environment the steam also increases the mass flow through the turbine wheel and thus increases the specific power of the engine.

Another advantage of this invention is that the addition of the water vapor to the combustor substantially reduces the emissions of nitrous oxide by lowering the flame temperature. In the prior art devices at gasification temperatures below those obtained with a 0.5 stoichiometric air-fuel ratio a catalyst was required in order to prevent the formation of carbon or soot. The injection of water vapor enriches the fuel with hydrogen which allows for a very lean air-fuel mixture to be used in the second stage thus lowering the NOX formation without an increae in smoke. The addition of a catalyst to the combustor of this invention would further improve performance of a wide variety of air-fuel mixture is required by the load schedule of the engine.

Thus there is provided a means for cooling the turbine allow higher turbine inlet temperatures with their attendant advantages as well as means for further utilizing the exhaust steam in increasing the engine's power output.

DESCRIPTION OF THE PREFERRED EMBODIMENT

Figure 1:
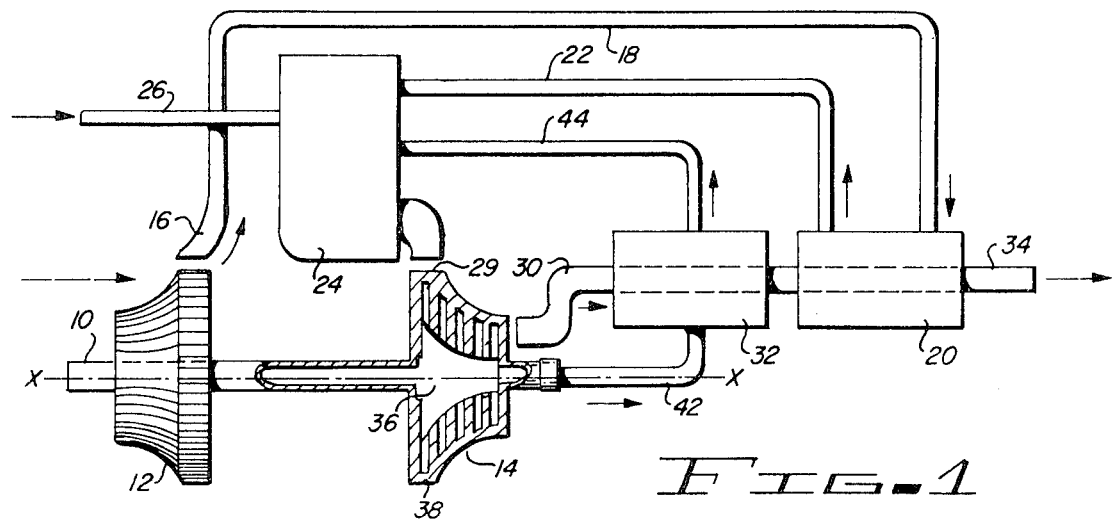
FIG. 1 is a schematic diagram of the gas turbine engine incorporating the engine.

Referring now to FIG. 1, there is shown a general schematic of the system which comprises a shaft 10 supported for rotation about axis X—X on bearings of any known type (not shown). Attached to the shaft 10 for rotation therewith is a compressor 12, shown here as a centrifugal compressor, and a turbine 14 shown as a radial inflow turbine. Air enters the inlet to the engine (not shown) and is compressed by the compressor 12 and discharged from the compressor into the diffuser member 16. From the diffuser it is conducted by means of conduit 18 into a recuperator heat exchanger 20. The outlet from the recuperator 20 shown at conduit 22 connects the recuperator to a combustor means 24. The combustor is supplied with fuel through a conduit 26 from a source not shown. The compressed air is heated in the combustor and is discharged to the turbine 14 at turbine inlet 29. The exhaust from the turbine discharges into conduit 30 which passes the exhaust gas through a super heater member 32 and then into recuperator 20. From there it is exhausted by means of conduit 34.

The cooling liquid for cooling turbine 14, indicated here as water, is introduced into the system through the hollow shaft 10 which supports the rotating components of the engine. The water is conducted through the shaft into the cavity 36 inside of the turbine hub. Radiating from the cavity 36 are a series of cooling passages 38 which extend from the hub out into the blade portions of the turbine. The water is heated by the hot turbine surfaces, becomes steam and is discharged through the back side of the turbine through outlet 40. It is then conducted by means of conduit 42 into the super heater 32. From the super heater it is conducted by means of conduit 44 into the combustor where it is utilized in a manner to be described below.

Figure 2:
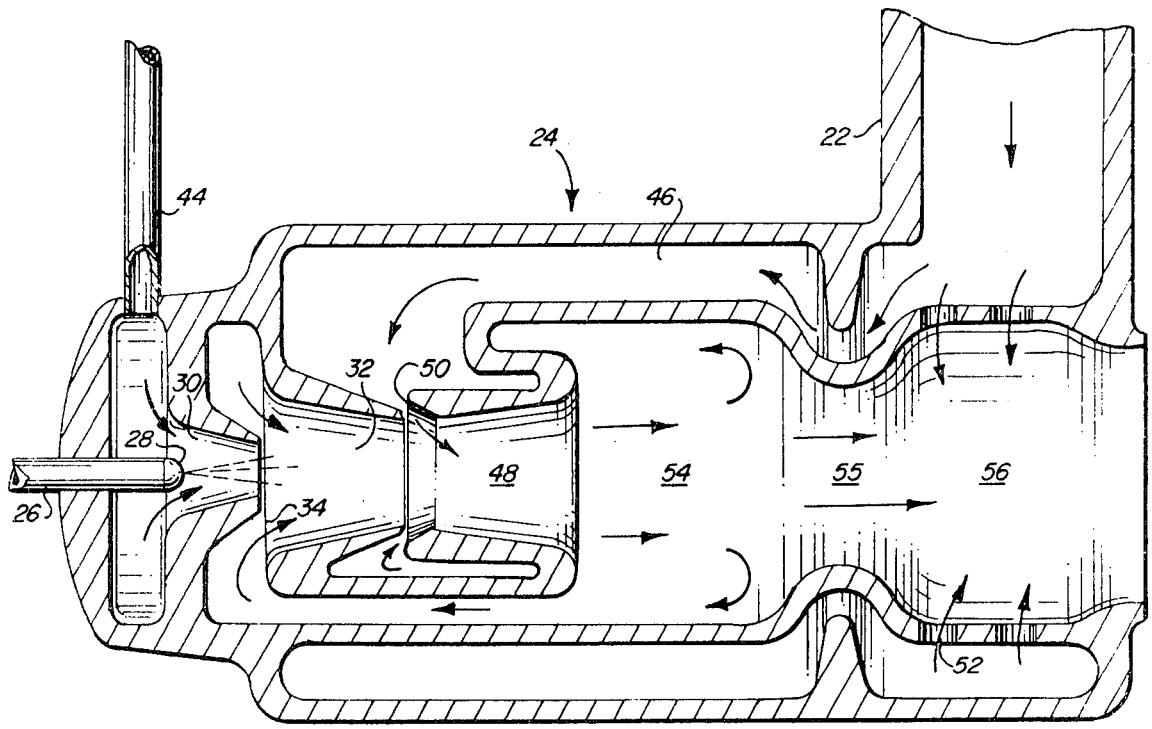
FIG. 2 is a sectional view of the combustor of FIG. 1.

Referring now to FIG. 2, there is shown a sectional view through the combustor 24 of FIG. 1. Fuel is supplied to the combustor through conduit 26 and is introduced into a premixing chamber 30 by means of nozzle 28. Steam from the super heater is introduced into the combustor by means of conduit 44 into the premix chamber 30 where it is mixed with fuel. The fuel and steam mixture is then introduced into a vaporization and mixing chamber 32 where it is mixed with air from the recuperator which enters the vaporization chamber through openings 34 in the combustor wall along with recirculating gas from the primary combustion and gasification chamber 54.

Primary air from the compressor 12 is received from the recuperator 20 through conduit 22 and is introduced into the combustor. A portion of the air from conduit 22 enters a toroidal chamber 46 which surrounds the combustion area of the combustor. Air from this chamber is introduced into the second mixing chamber 48 through means of openings 50 in the wall. Secondary air enters the combustor from conduit 22 by means of openings 52 which communicate directly with the conduit 22 on one side and with the toroidal chamber 46 on the other side. The fuel, steam and air mixture is gasified and ignited in chamber 54 where it burns in a fuel rich atmosphere in this primary combustion zone. There is provided a restriction 55 between the two combustion zones to cause a portion of the fuel-rich mixture to recirculate by means of opening 34 into the mixing chambers 32 and 48. This recirculation air at a temperature of approximately 700° C aids in gasification of the air-fuel mixture. This mixture is then diluted in chamber 56 by diluent air which enters the chamber through openings 52. Secondary combustion occurs in this chamber in a lean air-fuel atmosphere which aids in reduction of objectionable emissions.

Figure 3:
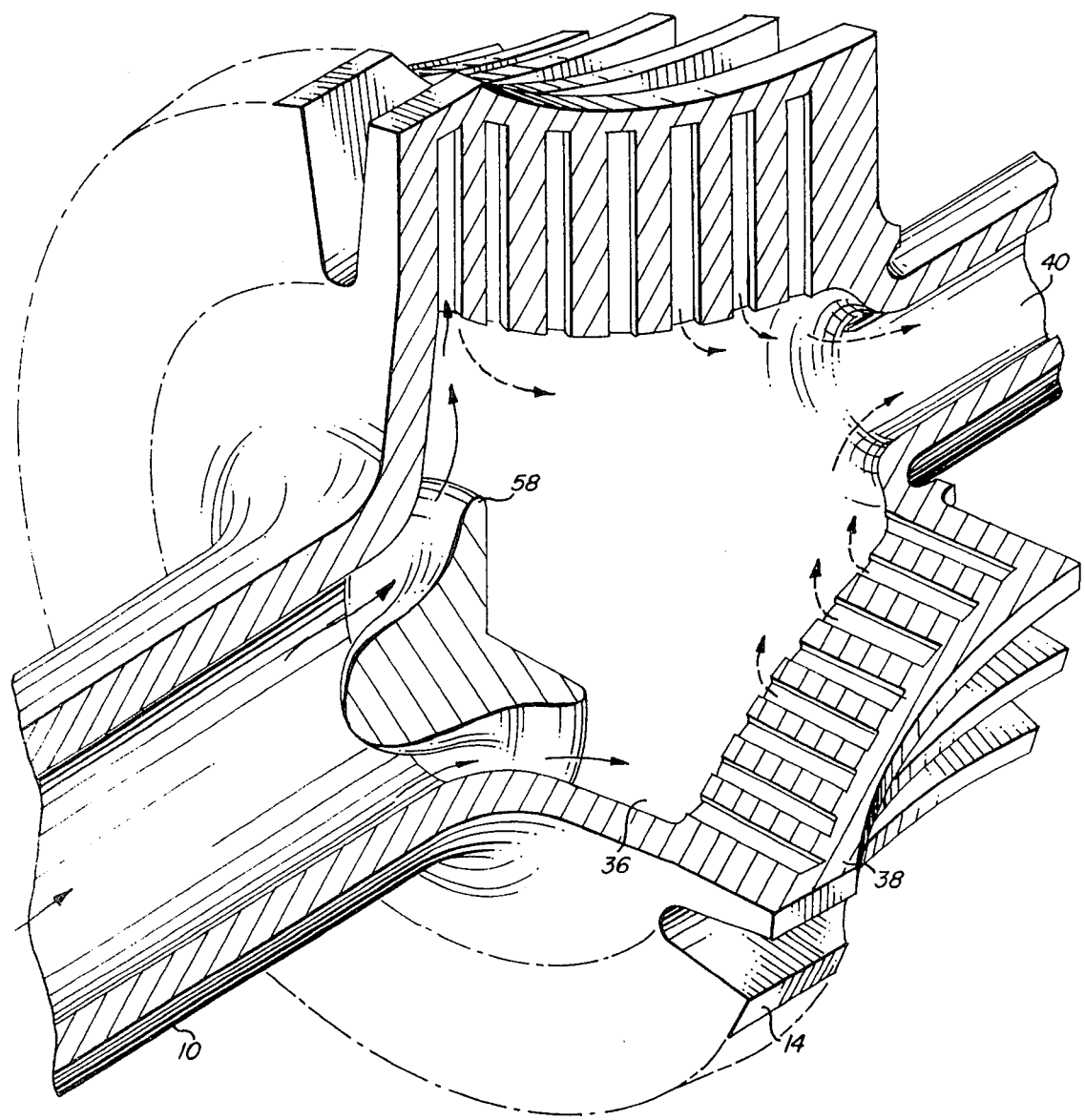
FIG. 3 is a partial sectional view of the turbine of the instant invention.

Referring now to FIG. 3, there is shown a partial sectional view of the details of the turbine 14. Water is introduced through the hollow shaft 10 and enters the chamber 36 in the hub of the turbine by means of openings provided around a plug member 58. The water mixture is forced by centrifugal force into the openings 38 in the blades of the turbine and flows to the outer end of these openings. The water is vaporized in these openings and steam returning through the same openings is then exhausted through conduit 40 on the exhaust side of the turbine. The use of a superheater is a practical, optional means for constructing the embodiment disclosed. A heat exchanger of any known type could be used. However, in order to withstand the high exhaust gas temperature it would have to be made of expensive super alloys. The use of the superheater provides two advantages. First, all of the energy contained in the steam is returned to the cycle. Some energy would be lost using a conventional heat exchanger since such devices are less than 100% efficient. Secondly, the superheater can be made from more conventional metals and thus be provided at a lower cost.

Thus it can be seen there is provided herein a high temperature gas turbine power plant which operates on a modified open Brayton cycle with the application of water or water-methanol to the engine for cooling the turbine and further processing this fluid in the combustor to aid in the gasification of the fuel, reduce the combustor flame temperature for favorable emission's correction and to increase the specific power of the engine by increasing the mass flow through the engine.

Obviously many modifications and variations of the present invention are possible in light of the above teachings. It is therefore to be understood that within the scope of the appended claims the invention may be practiced otherwise than as specifically described.

What is claimed is:

1. A combustor for a gas turbine engine said engine having a compressor and a turbine cooled by a fluid with a boiling point above standard atmospheric temperature and pressure, said combustor comprising:
   a premixing chamber connected to a source of engine fuel and the cooling fluid outlet from said turbine;
   a first mixing chamber for mixing and vaporizing the fuel and cooling fluid mixture from said premixing chamber;
   a second mixing chamber operatively associated with said first mixing chamber and receiving the contents thereof for mixing the contents of said first mixing chamber with a portion of cycle fluid from said compressor;
   a first combustion chamber connected to said second mixing chamber and receiving the contents thereof for gasification and primary combustion of the contents of said second mixing chamber; and
   a second combustion chamber operably associated with said first combustion chamber and receiving the contents thereof together with the remainder of the cycle fluid from said compressor for secondary combustion therein.

2. The combustor according to claim 1 and further comprising restriction means between said first and second combustion chambers for recirculating a portion of the mixture in said first combustion chamber to said first mixing chamber.

3. A combustor for a gas turbine engine having a turbine cooled by a fluid with a boiling point above standard atmospheric temperature and pressure, comprising:
   a first mixing chamber to receive combustible fuel from the gas turbine engine fuel source and cooling fluid from the fluid cooled gas turbine for mixing the fuel and cooling fluid;
   a second mixing chamber to receive the mixed fuel and cooling fluid from said first mixing chamber and cycle fluid from the gas turbine engine compressor for vaporizing and mixing the mixture therein;
   a first combustion chamber to receive the mixture from said second mixing chamber for gasification and primary combustion thereof in said first combustion chamber; and
   a second combustion chamber separated from said first combustion chamber to receive the gasification and combustion products from said first combustion chamber and additional cycle fluid from the gas turbine engine compressor for secondary combustion thereof in said second combustion chamber.

4. The combustor of claim 3 further comprising restriction means between said first and second combustion chambers for recirculating a portion of the mixture in said first combustion chamber to said first mixing chamber.

5. The combustor of claim 1 wherein the cooling fluid is water.

6. The combustor of claim 1 wherein the cooling fluid is a mixture of water and methanol.

7. The combustor of claim 3 wherein the cooling fluid is water.

8. The combustor of claim 3 wherein the cooling fluid is a mixture of water and methanol.

9. In a gas turbine engine having a compressor for compressing a cycle fluid, and a turbine with a fluid inlet and a fluid outlet and cooled by a fluid with a boiling point above standard atmospheric temperature and pressure, said fluid flowing through said turbine and exiting the same via said fluid outlet, a combustor comprising a first mixing chamber for receiving and mixing fuel from an engine fuel source and cooling fluid exiting the turbine via said fluid outlet; a second mixing chamber for receiving the fuel and cooling fluid from said first mixing chamber and cycle fluid from the engine compressor for vaporizing and mixing the fuel, cooling fluid, and cycle fluid; a first combustion chamber for receiving the mixture from said second mixing chamber for gasification and combustion thereof; and a second combustion chamber separated from said first combustion chamber for receiving the gasification and combustion products from said first combustion chamber and additional cycle fluid for secondary combustion thereof in said second combustion chamber.

10. The combustion of claim 9 including restriction means between said first and second combustion chambers for recirculating a portion of the mixture in said first combustion chamber to said first mixing chamber.

11. The combustor of claim 9 wherein said cooling fluid is water.

12. The combustor of claim 9 wherein said cooling fluid is a mixture of water and methanol.

* * * * *